US011604086B2

(12) United States Patent
Garoon et al.

(10) Patent No.: US 11,604,086 B2
(45) Date of Patent: Mar. 14, 2023

(54) MEASUREMENT OF FLOW RATE FROM A REFLECTED SIGNAL

(71) Applicant: FlowCommand Inc., Houston, TX (US)

(72) Inventors: Jeffrey Garoon, Houston, TX (US); David Shaw, Nazareth, PA (US)

(73) Assignee: FlowCommand Inc., Houston, TX (US)

( * ) Notice: Subject to any disclaimer, the term of this patent is extended or adjusted under 35 U.S.C. 154(b) by 1044 days.

(21) Appl. No.: 16/270,300

(22) Filed: Feb. 7, 2019

(65) Prior Publication Data

US 2019/0242735 A1     Aug. 8, 2019

Related U.S. Application Data

(60) Provisional application No. 62/628,149, filed on Feb. 8, 2018.

(51) Int. Cl.
*G01F 1/663* (2022.01)
*G01F 1/667* (2022.01)
*G01P 5/24* (2006.01)

(52) U.S. Cl.
CPC .............. *G01F 1/663* (2013.01); *G01F 1/668* (2013.01); *G01P 5/241* (2013.01); *G01P 5/245* (2013.01)

(58) Field of Classification Search
CPC .......... G01F 1/663; G01F 1/668; G01P 5/241; G01P 5/245
See application file for complete search history.

(56) References Cited

U.S. PATENT DOCUMENTS 5,415,048 A * 5/1995 Diatschenko ............ G01F 1/88
73/861.04
5,633,809 A * 5/1997 Wissenbach ............ G01F 1/005
73/861.23

FOREIGN PATENT DOCUMENTS

GB           2342444 A  *  4/2000 ............. G01F 1/663

OTHER PUBLICATIONS

Brigham, "The Fast Fourier Transform", 1974 Prentice-Hall Inc. (Year: 1974).*
Takeda, "Velocity Profile Measurement by Ultrasonic Doppler Method", Experimental Thermal and Fluid Science 1995; 10:444 453 (Year: 1995).*
Simetkosky et al., "A Modified Goertzel Structure for Efficient Real-Time Blood Velocity Profile Estimation", 2002 downloaded from IEEE Explore (Year: 2002).*
Lin et al., "FPGA-based Spectrum Analyzer with High Area Efficiency by Goertzel Algorithm", 2008 Congress on Image and Signal Processing, IEEE Computer Society (Year: 2008).*
Shufen, "Doppler Frequency Extraction and Estimation of Range and Speed of Moving Target", ICSP 2008 Proceedings 2008, pp. 2636-2639 (Year: 2008).*

* cited by examiner

*Primary Examiner* — Regis J Betsch
(74) *Attorney, Agent, or Firm* — Cognition IP, P.C.; Edward Steakley; Schiller Hill

(57) ABSTRACT

A method and system may be used to measure the fluid flow rate of fluid in a pipeline. In the method and system, a signal may be transmitted by a transducer into the pipeline. The signal may be reflected by the contents of the pipeline and received by a receive transducer. Operations may be performed on the received signal to determine the fluid flow rate.

18 Claims, 5 Drawing Sheets

MEASUREMENT OF FLOW RATE FROM A REFLECTED SIGNAL

CROSS-REFERENCE TO RELATED APPLICATIONS

This application claims the benefit of U.S. Provisional Patent Application No. 62/628,149, filed Feb. 8, 2018, which is hereby incorporated by reference in its entirety.

FIELD OF THE INVENTION

The present invention relates to software and hardware for measuring the flow rate of a fluid flowing through a pipeline.

BACKGROUND

In industrial applications it is desirable to measure the flow rate of a fluid flowing through a pipeline. It is advantageous to be able to measure the flow using a computerized device outside of a pipeline so that the device may be installed without requiring access to the inside of the pipeline, which would require turning off the fluid flow. Historically, it has been difficult to achieve a high level of accuracy in measuring fluid flow using devices mounted outside of a pipeline.

It would be desirable for there to be more accurate algorithms for interpreting the sensor data of devices for measuring fluid flow from outside of a pipeline. An advantage of such an algorithm would be measuring fluid flow accurately while using a hardware device that can be easily mounted on the outside of a pipeline.

SUMMARY OF THE INVENTION

One embodiment relates to determining the flow rate of a fluid in a pipeline by transmitting a signal into the outer shell of the pipeline and receiving a signal reflected from the contents of the pipeline. Processing may be performed on the reflected signal to determine a Doppler frequency from which the flow rate by be computed.

Another embodiment relates to determining the flow rate of a fluid in a pipeline by receiving a signal, processing the signal, analyzing the signal to determine the Doppler component, and computing the fluid flow rate from the Doppler frequency.

Another embodiment relates to determining the flow rate of a fluid in a pipeline by receiving a signal, filtering the signal to remove noise in frequencies not relevant for subsequent processing, processing the filtered signal to cancel the transmission frequency, decimating the signal, analyzing the residual to determine the Doppler component, averaging across one or more samples, and computing the fluid flow rate from the Doppler frequency.

Another embodiment relates to determining the flow rate of a fluid in a pipeline by receiving a signal, filtering the signal to remove noise in frequencies not relevant for subsequent processing, processing the filtered signal to cancel the transmission frequency by using adaptive filtering, decimating the signal, analyzing the residual to determine the Doppler component by using one or more Goertzel detectors, averaging across one or more samples, and computing the fluid flow rate from the Doppler frequency.

Another embodiment relates to determining the flow rate of a fluid in a pipeline by receiving a signal, filtering the signal to remove noise in frequencies not relevant for subsequent processing, processing the filtered signal to cancel the transmission frequency by using adaptive filtering, decimating the signal, analyzing the residual to determine the Doppler component by using one or more Goertzel detectors, averaging across one or more samples, and computing the fluid flow rate from the Doppler frequency and other fluid properties using time-of-flight.

DETAILED DESCRIPTION

Figure 1:
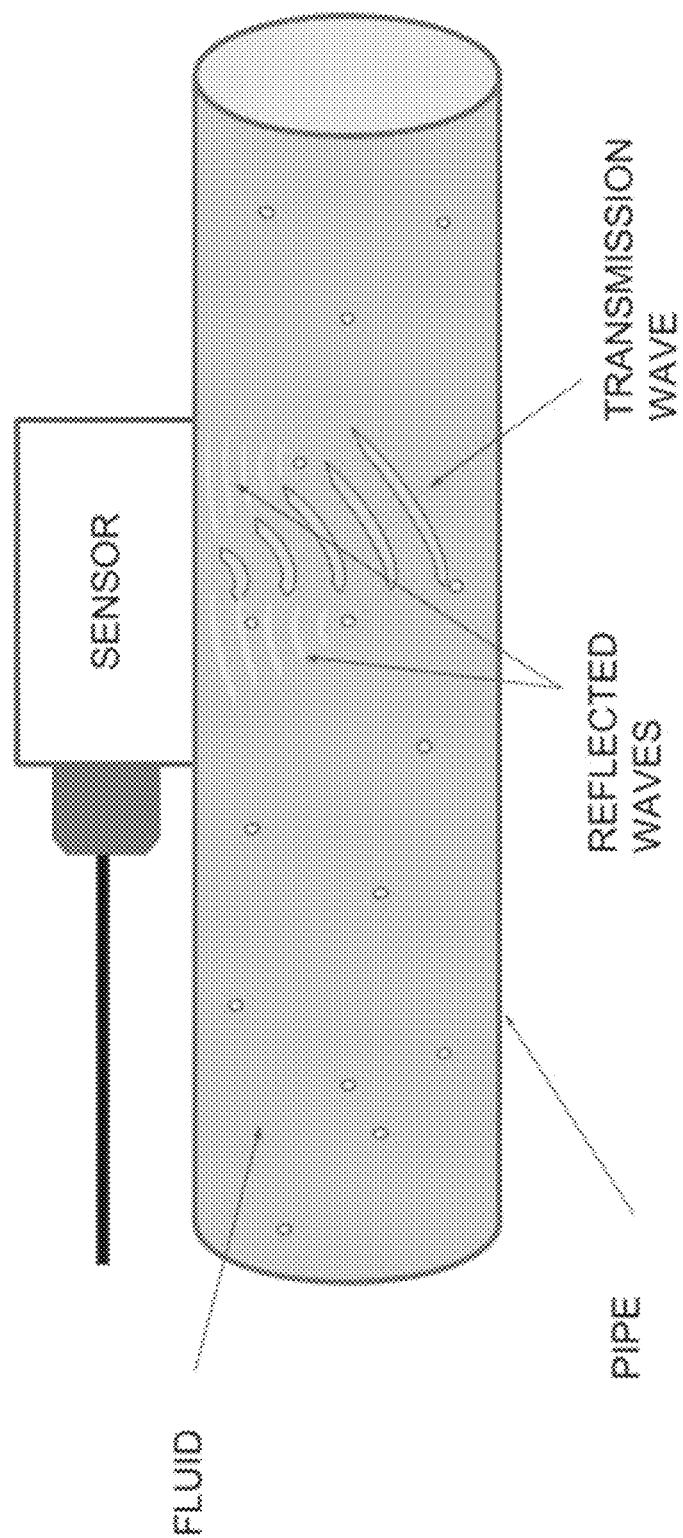
FIG. 1 is diagram illustrating an exemplary usage of an ultrasonic transducer to send and receive a signal in a pipeline.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Embodiments of the invention may comprise one or more computers. Embodiments of the invention may comprise software and/or hardware. Some embodiments of the invention may be software only and may reside on hardware. A computer may be special-purpose or general purpose. A computer or computer system includes without limitation electronic devices performing computations on a processor or CPU, personal computers, desktop computers, laptop computers, mobile devices, cellular phones, smart phones, PDAs, pagers, multi-processor-based devices, microprocessor-based devices, programmable consumer electronics, cloud computers, tablets, minicomputers, mainframe computers, server computers, microcontroller-based devices, DSP-based devices, embedded computers, wearable computers, electronic glasses, computerized watches, and the like. A computer or computer system is further defined to include distributed systems, which are systems of multiple computers (of any of the aforementioned kinds) that communicate with each other, possibly over a network. Distributed systems may include clusters, grids, shared memory systems, message passing systems, and so forth. Thus, embodiments of the invention may be practiced in distributed environments involving local and remote computer systems. In a distributed system, aspects of the invention may reside on multiple computer systems.

Embodiments of the invention may comprise computer-readable media having computer-executable instructions or data stored thereon. A computer-readable media is physical media that can be accessed by a computer. It may be non-transitory. Examples of computer-readable media include, but are not limited to, RAM, ROM, hard disks, flash memory, DVDs, CDs, magnetic tape, and floppy disks.

Computer-executable instructions comprise, for example, instructions which cause a computer to perform a function or group of functions. Some instructions may include data. Computer executable instructions may be binaries, object code, intermediate format instructions such as assembly language, source code, byte code, scripts, and the like. Instructions may be stored in memory, where they may be accessed by a processor. A computer program is software that comprises multiple computer executable instructions.

A network comprises one or more data links that enable the transport of electronic data. Networks can connect computer systems. The term network includes local area network (LAN), wide area network (WAN), telephone networks, wireless networks, intranets, the Internet, and combinations of networks.

The terms "connected to" and "coupled to" include indirect connection and indirect coupling in addition to direct connection and direct coupling. These terms include connection or coupling through a network pathway where the network pathway includes multiple elements.

To perform an action "based on" certain data or to make a decision "based on" certain data does not preclude that the action or decision may also be based on additional data as well. For example, a computer performs an action or makes a decision "based on" X, when the computer takes into account X in its action or decision, but the action or decision can also be based on Y.

In this patent, "computer program" means one or more computer programs. A person having ordinary skill in the art would recognize that single programs could be rewritten as multiple computer programs. Also, in this patent, "computer programs" should be interpreted to also include a single computer program. A person having ordinary skill in the art would recognize that multiple computer programs could be rewritten as a single computer program.

The term computer includes one or more computers. The term computer system includes one or more computer systems. The term computer server includes one or more computer servers. The term computer-readable medium includes one or more computer-readable media.

FIG. 1 illustrates one embodiment of the invention where a sensor attached to the outside of a pipeline transmits a signal into and through the pipeline into fluid flowing within the pipeline. The signal is reflected back by the contents of the pipeline, such as by bubbles or particles that may naturally occur in the fluid or that are artificially introduced, and recorded by the sensor. The sensor reads the received signal. A computer connected physically or wirelessly to the sensor may determine the Doppler frequency from the received signal and thereby determine the flow rate (velocity) of the fluid.

For example, in an embodiment, a signal is injected into the outer shell of the pipeline using a piezoelectric transducer or transmitter. An equivalent receive transducer is used to capture the return reflections from the content of the pipeline. The transmitted signal may bounce off the suspended particles or bubbles inside the fluid and is then captured by the receive transducer.

If the particles are moving, then the received signal may encounter some shift in the received frequency compared to that transmitted. This change in frequency is known as Doppler shift. The amount of Doppler shift is directly proportional to the velocity of the reflecting particles or bubbles in the pipe.

Embodiments may be used to determine flow rate for single phase flows, such as single phase fluids or gases, or may be used for multi-phase flows comprising materials with different states or phases. Slurries are an example of a multi-phase flow. Embodiments herein may refer to the flow rate of a fluid but it should be understood that a fluid may comprise a gas or other phases and need not be liquid.

Figure 2:
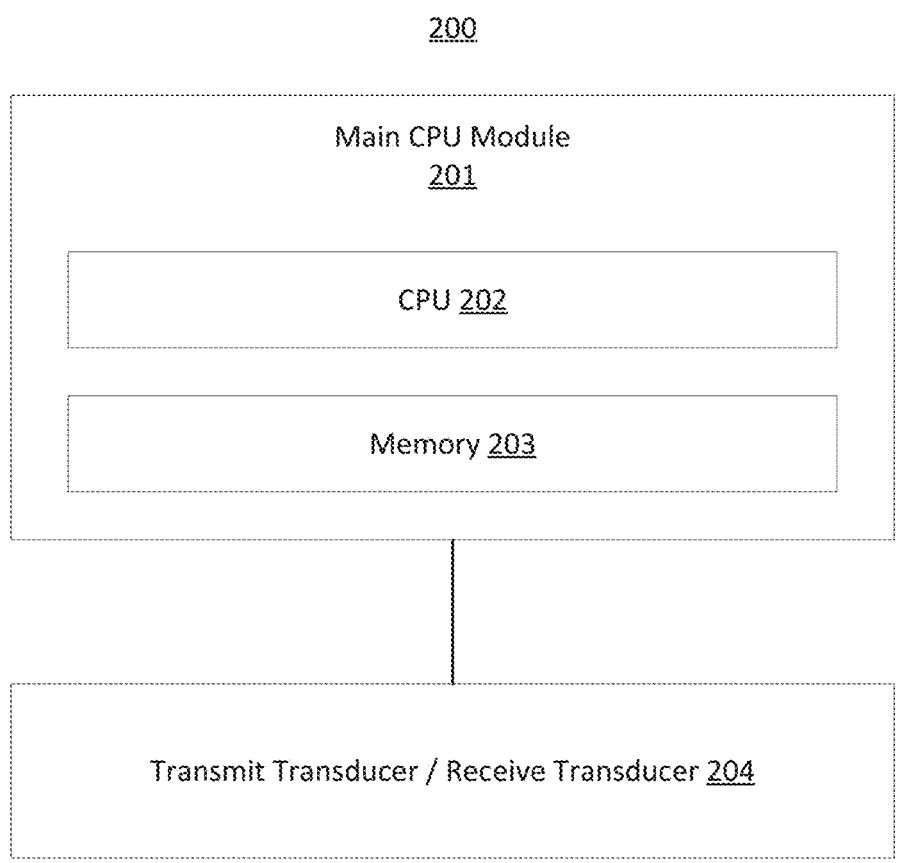
FIG. 2 is a diagram illustrating an exemplary hardware device that may be used in some embodiments of the invention.

FIG. 2 illustrates the architecture of an exemplary hardware device 200 that may be used in some embodiments. The hardware device 200 includes a main CPU module 201 comprising a CPU 202 and memory 203. CPU 202 may execute instructions and memory 203 may store computer instructions and data. The main CPU module 201 may be connected to a transmit transducer and receive transducer 204. The hardware device may include additional components not illustrated here. The methods described herein may be performed by the hardware device 200. The methods described herein may also be performed by other computer systems and computerized devices. For example, the methods described herein may be performed either by the hardware device that collects the sensor data or on other separate computer systems. Such separate computer systems may or may not be involved in the collection of the sensor data.

Figure 3:
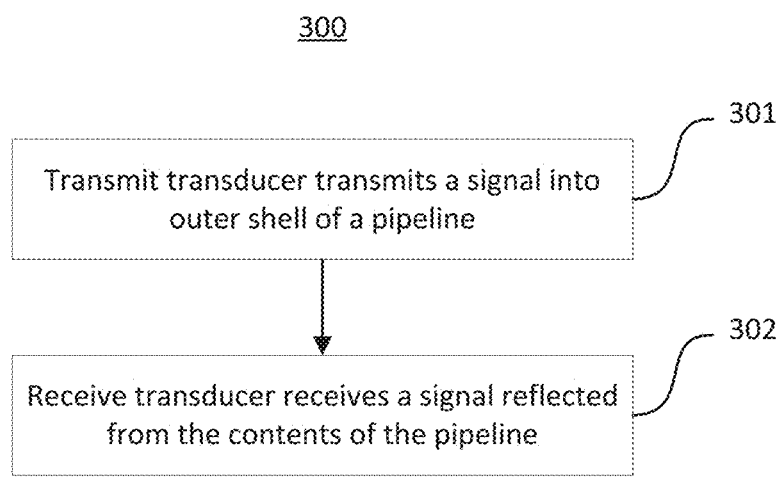
FIG. 3 is a flow chart illustrating an exemplary method that may be performed in some embodiments.

FIG. 3 is a flow chart illustrating an exemplary method 300 that may be performed in some embodiments. In step 301, a transmit transducer transmits a signal, such as a sound wave, into the outer shell of a pipeline. The transmit transducer may be a piezoelectric ultrasonic transducer and transmits a sound wave through the pipe wall and any scaling or paraffin buildup. The sound wave reflects off the suspended bubbles, gas, or solids present in the flow stream. In step 302, a receive transducer receives this signal that is reflected from the contents of the pipeline. The receive transducer may be a piezoelectric ultrasonic transducer and may share the same crystal oscillator as the transmit transducer. The receive transducer may be equivalent to the transmit transducer.

Figure 4:
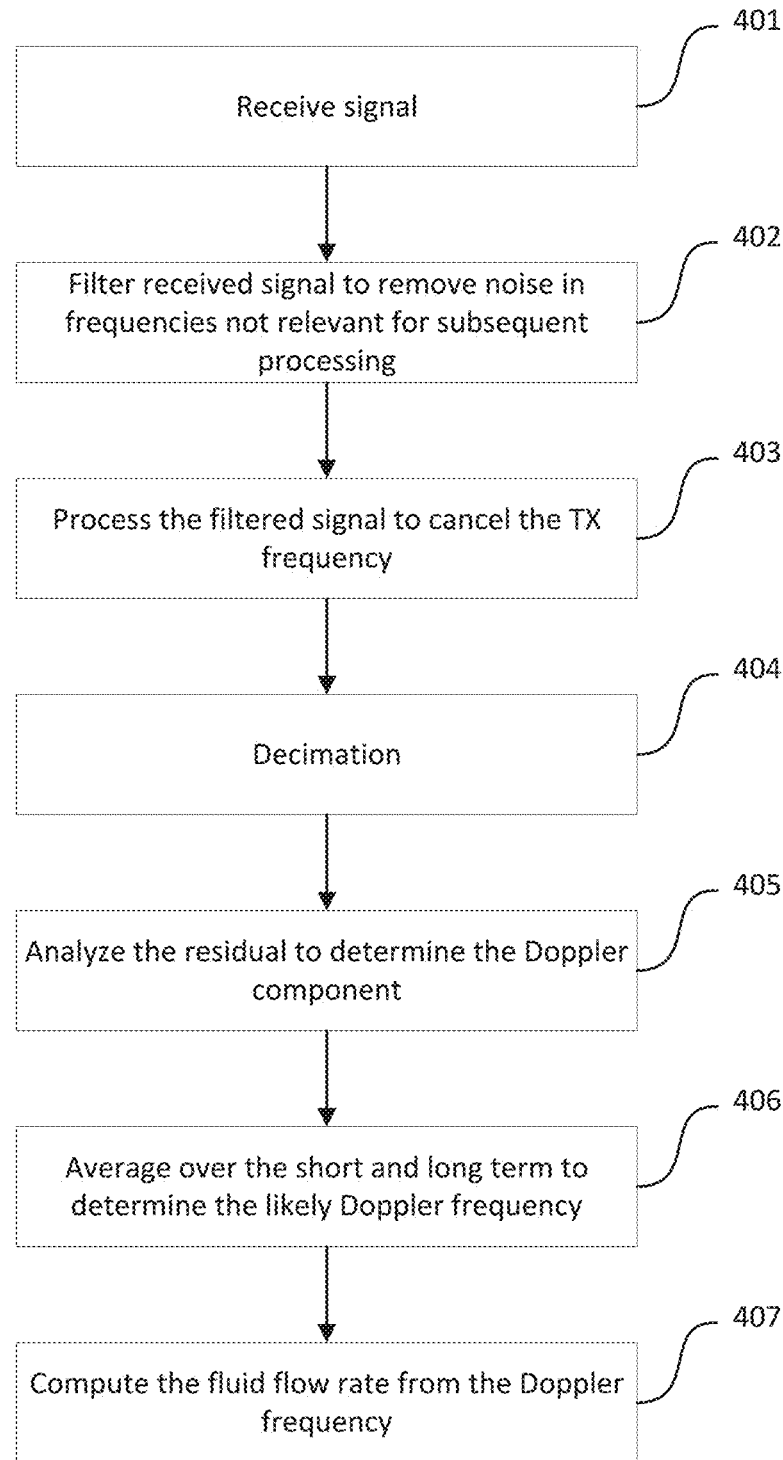
FIG. 4 is a flow chart illustrating an exemplary method that may be performed in some embodiments.

FIG. 4 is a flow chart illustrating an exemplary method 400 that may be performed in some embodiments to calculate flow rate of a fluid, whether single or multi-phase. The method operates on the signal received by the receive transducer and includes a series of operations cascaded to separate various parts of the received signal in order to extract the desired characteristics. In step 401, a received signal is received by the receive transducer. In step 402, the received signal is filtered to remove noise in frequencies that are not relevant to the subsequent processing. In step 403, the output from the filter is then processed to cancel a portion of the transmission frequency found in the received signal. In some embodiments, this step includes attempting to cancel as much of the transmission frequency found in the received signal as possible. In such an embodiment, the effect of transmission cancellation is that the residual signal is dominated by the Doppler components of the received signal if the pipeline contains detectable fluid movement. In step 404, optionally, the received signal may be decimated. In some embodiments, the decimation is performed by a factor of 2× by removing every other signal sample. In another embodiment, it is possible that steps 403 and 404 could occur in reverse order, with decimation preceding the cancellation. In step 405, the residual remaining after the decimation is analyzed to determine the Doppler component. In step 406, averaging over the short and long term is performed to determine the likely Doppler frequency. A plurality of Doppler frequencies determined through performance of steps 401-405 may be averaged to obtain a more accurate estimate of the true Doppler frequency. Because the detectability of the fluid flow is statistical in nature, averaging may be used in some embodiments, both over the short and long term, to determine the most likely Doppler frequency. In step 407, the fluid flow rate may be computed from the Doppler frequency. The fluid flow rate may be computed from the Doppler frequency using the following formula:

$$\text{velocity} = \frac{C(1 - freq_{doppler})}{freq_{doppler}}$$

C is the speed of sound in the medium, which is provided based on the known medium in the pipeline. Velocity is the fluid velocity or flow rate, which is derived by knowing the Doppler frequency and C. The speed of sound may be inputted manually and thus may be received by a computer system as a manual input of a user for use in the aforementioned equation. In other embodiments, the speed of sound may be calculated by measuring time of flight of acoustic signals transmitted by, for example, the transmit transducer into the medium in the pipeline.

Figure 5:
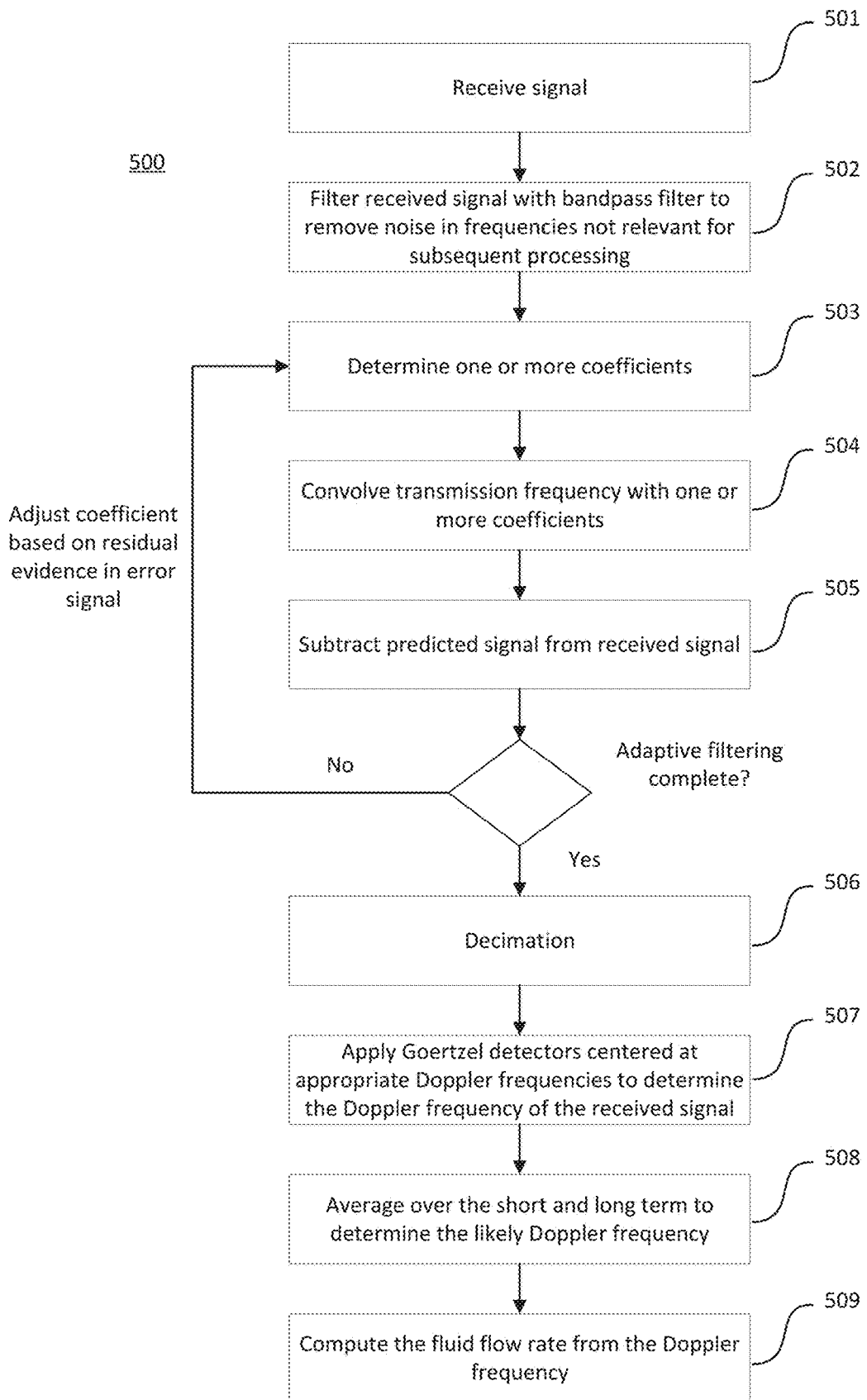
FIG. 5 is a flow chart illustrating an exemplary method that may be performed in some embodiments.

FIG. 5 is a flow chart illustrating an exemplary method 500 that may be performed in some embodiments to calculate flow rate of a fluid, whether single or multi-phase. The method operates on the signal received by the receive transducer and includes a series of operations cascaded to separate various parts of the received signal in order to extract the desired characteristics. In step 501, a received signal is received by the receive transducer. In step 502, the received signal is filtered to remove noise in frequencies that are not relevant to the subsequent processing.

The received signal contains the reflected signal and may also contain a lot of noise over the total received frequency band, so it may be filtered to remove much of the extraneous signal content. Step 502 may include applying a bandpass filter that is configured to pass frequencies in a narrow region around the transmit frequency of the transmit transducer. The bandpass filter passes the full range of expected doppler frequencies that occur in the narrow region around the transmit frequency, and eliminates frequencies outside of this region.

In particular, one source of noise may be clock signals that generate noise at certain frequencies. To eliminate this noise, the bandpass filter may be a finite impulse response (FIR) filter or infinite impulse response (IIR) filter that has zeros in the places where the most significant clock components occur to eliminate or reduce their influence.

In steps 503-505, the received signal may be processed to cancel the transmission frequency. The transmitted signal from the transmit transducer may be received by the receive transducer. The signal received by the receive transducer may thus include components of the transmitted signal in the received signal. The effects of the transmitted signal may be eliminated or reduced with filtering. By cancelling the transmission frequency, the effect may be to expose the Doppler signal to facilitate easier and more accurate measurement.

Adaptive filtering may be used to cancel the transmission frequency in the received signal. Least mean squares adaptive filtering is one method of adaptive filtering that may be used in an embodiment. Alternatively, other adaptive filtering techniques may be used, including the use of machine learning algorithms or neural network techniques for adaptive filtering. The transmission frequency is known because it is the frequency emitted by the transmit transducer. The amplitude and phase of the transmit signal component in the received signal may be unknown and may be found using adaptive filtering, such as least mean squares adaptive filtering or adaptive filtering by a machine learning model.

For example, in step 503, one or more coefficients may be determined to model aspects of a transmit signal component in the received signal. These coefficients may model amplitude and phase. In step 504, the one or more coefficients may be convolved with the transmission frequency from the transmit transducer to generate a predicted signal, which predicts the transmit signal component in the received signal. In step 505, the predicted signal may be subtracted from the received signal and an error computed. The adaptive filtering algorithm may be used to update the one or more coefficients to minimize the error. The adaptive filtering algorithm may use step sizes where large step sizes are used to converge quickly to a solution, and smaller step sizes are used for more refined adjustments of the one or more coefficients.

In one embodiment, a chirp signal may be emitted from the transmit transducer and subsequently received by the receive transducer. The time that passes between the transmit and receive may be used to determine properties of the fluid inside the pipeline in order to reduce error. The phase of the complex coefficient in the adaptive filter may also contain information relating to the time of flight and fluid properties and may be used to determine those properties.

In one embodiment, a single complex adaptive filter coefficient may be used in steps 503-505 to model the amplitude and phase of the transmit signal component, rather than using more than one coefficient. The single complex coefficient is used to scale and rotate the transmit signal to the correct magnitude and phase to match the transmit signal component in the received signal. The single complex coefficient may be the cartesian equivalent of the magnitude and phase. Thus, the transmitted signal output by the transmit transducer may be convolved with the complex coefficient to model the transmit signal component of the received signal. In other words, the transmitted signal from the transmit transducer may be convolved with the complex coefficient. The result of the combination is a predicted signal that predicts the transmit signal component in the received signal. This predicted signal is then subtracted from the filtered received signal, and an error is produced. The complex coefficient is then updated—using said produced error—to minimize the residual error in subsequent iterations.

The least mean squares adaptive filter uses step sizes to adjust the complex coefficient based on residual error signal. A large step size may be used initially to train very fast and converge quickly, but it may result in a fairly wide range of frequencies tracked instead of the exact transmission frequency, thus removing some of the desired Doppler components. Once a reasonable degree of cancellation is achieved, the step size may be reduced to continue minimal tracking, but over a narrow frequency range. An additional option for use of step sizes would include a multiplicity greater than 2, or even a continuously variable step size, the control of which, may be derived from a set of performance criteria related to the residual error. Thus, least mean squares adaptive filtering may be used to learn or determine the complex coefficient.

If there is no fluid flow in the pipeline, then the above method may return a result indicating that there is no evidence of any Doppler signal after subtraction of the transmit frequency.

In step 506, optionally, decimation may be performed to downsample the signal. Decimation may be used to down sample the signal by a factor, where the factor may be chosen from, for example, 1.5, 2, 2.5, 3, 4, and so on. In an embodiment, decimation by a factor of 2 is performed by ignoring every other sample for the subsequent processing.

In the same context as discussed regarding FIG. 4, an alternate embodiment may have the decimation of step 506 preceding the cancellation beginning at step 503. In this embodiment, then the reference of the transmit signal will also require exactly the same decimation as the received signal.

In step 507, the received signal is analyzed to determine the Doppler frequency. Goertzel detectors may be used to determine the Doppler frequency. Goertzel detectors are individual component detectors similar to a Discrete Fourier Transform (DFT) at very specific desired frequencies.

A Goertzel detector behaves similarly to an oscillator that can be driven with an input signal. The internal response of the oscillator will grow in sympathy with any content in the driving signal that is centered at the specific frequency of the desired oscillation. In step 507, a bank of Goertzel detectors may be created, allowing for discrimination between very closely spaced frequencies over a narrow subset of the sampling rate range.

The Goertzel detectors may be implemented similarly to a biquad filter section, but with the difference that only the feedback section is implemented. Because the feedback section is effectively the part that represents the poles in the impulse response, and because the Goertzel detector is being used as an equivalent of an oscillator, the poles lie on the unit circle. The coefficients are 1 or −1 except for the one that selects the desired frequency. The middle coefficient may be selected to be $2*\cos(2*\pi*fc_n/fs)$. A table of coefficients may be created for the various $fc_n$ the n frequencies that are desired. The $fc_n$ frequencies may be selected at equally spaced intervals to allow discrimination at the desired increments of the fluid flow. For consistency with Fast Fourier Transform (FFT) nomenclature, these frequencies will be referred to as bin frequencies. If more accuracy is desired at lower flow rates, the Goertzel detectors may be selected at unequally spaced intervals that reflect this desire. For example, if a certain percentage error is required, then the Goertzel detectors sympathetic with high Doppler deviation may be separated further apart than those responsive to the lower Doppler deviations, for instance in a logarithmic pattern.

In an embodiment, a table is constructed to implement one or more distinct Goertzel detectors. Some embodiments may include 2-50 Goertzel detectors, 50-100 Goertzel detectors, 100-200 Goertzel detectors, 150-250 Goertzel detectors, 200-500 Goertzel detectors, 50-300 Goertzel detectors, 500-1,000 Goertzel detectors, 400 Goertzel detectors, at least 10 Goertzel detectors, at least 20 Goertzel detectors, at least 50 Goertzel detectors, at least 100 Goertzel detectors, at least 200 Goertzel detectors, at least 400 Goertzel detectors, at least 1,000 Goertzel detectors, or other quantities of Goertzel detectors. For exemplary purposes, let us consider an embodiment with 200 distinct Goertzel detectors.

The Goertzel detectors may be centered at Doppler frequencies that would discriminate velocities from −3 m/sec to +3 m/sec in 0.03 m/sec increments. Each Goertzel detector may be centered at a slightly different Doppler frequency and equally spaced to allow discrimination of fluid flow at the desired increments. These Goertzel bins result in a distinction of just a very few Hz in a narrow region around the transmission frequency. The transmission frequency may fall in the 99 or 100 bin in the example with 200 Goertzel detectors. In experiments with salt water testing, with speed of sound in the medium C=1484 m/sec, the separation is derived by dividing the smallest detectable velocity by C, resulting in 0.03/1484*639999.986=12.94 Hz.

In another embodiment, the Goertzel detectors may be centered at Doppler frequencies that would discriminate velocities from −3 m/sec to +3 m/sec in 0.015 m/sec increments. In such an example, 400 Goertzel detectors may be used and may each be centered at a slightly different Doppler frequency and equally spaced.

In an embodiment, one or more Goertzel detectors are centered at Doppler frequencies that discriminate velocities from at least −3 meters per second to at least +3 meters per second in increments of 0.03 meters per second or less. In an embodiment, one or more Goertzel detectors are centered at Doppler frequencies that discriminate velocities from at least −3 meters per second to at least +3 meters per second in increments of 0.015 meters per second or less.

In an alternative embodiment, a Fast Fourier Transform (FFT) may be used to discriminate various frequencies in the received signal and determine the Doppler frequency.

In step 508, averaging over the short and long term may be performed to determine the likely Doppler frequency. A plurality of Doppler frequencies determined through performance of steps 501-507 may be averaged to obtain a more accurate estimate of the true Doppler frequency. Because the detectability of the fluid flow is statistical in nature, averaging may be used in some embodiments, both over the short and long term, to determine the most likely Doppler frequency. Other statistical methods such as frequency interpolation, and Gaussian fitting may also be used. In step 509, the fluid flow rate may be computed from the Doppler frequency by using the formula disclosed above in step 407 relating Doppler frequency to speed of sound in the medium and flow rate.

The algorithms and methods described in this document have been developed in order to determine the flow rate (velocity) of a fluid flowing through a pipeline. The techniques relate to transmitting an ultrasonic signal into a section of a pipeline and receiving the reflection of the signal from the pipeline to determine the flow rate of a fluid inside the pipe.

Experiments were performed using a brine solution with speed of sound in the medium assumed to be 1484 m/sec. Use of an inexact number for the speed of sound may cause a slight scaling of the true flow rate of the fluid in the pipe.

In one embodiment, the transmission frequency of the transmit transducer is chosen to be 640,000 Hz or approximately 640,000 Hz. In some embodiments, the transmission frequency used by the transmit transducer may be in the range 320,000 to 640,000 Hz, 320,000 Hz to 960,000 Hz, 640,000 to 1,280,000 Hz, 480,000 Hz to 800,000 Hz, 600,000 Hz to 680,000 Hz, 540,000 Hz to 740,000 Hz, and so on. Some frequencies that may be used, for example, are 639999.3896484375 Hz and 639999.98569488525390625 Hz. Table indexing may be used to generate the tone which allows for precision in the transmission frequency. The exact frequency may vary based on the precision of the crystal oscillator used in the hardware. In some embodiments, the transmit transducer and receive transducer use the same oscillator so that any variation in the actual frequency is equivalently compensated between the transmit transducer and receive transducer. This equivalence may be desirable for the transmit signal cancellation process. The transmission frequency may be fixed, and it may be variable over time.

Embodiments described herein may discriminate movement in a pipeline as low as 0.03 m/sec and over a range of −25 m/sec to +25 m/sec. Moreover, embodiments herein have been designed to be able to discriminate movement in a pipeline as low as 0.015 m/sec and over a range of −3 m/sec to +3 m/sec.

The Doppler frequency and fluid flow may be related by the speed of sound in the medium as follows:

$$\text{velocity} = \frac{C(1 - \text{freq}_{doppler})}{\text{freq}_{doppler}}$$

In an example where the speed of sound C=1484 and velocity is 0.015, this represents a ratio of 0.999989892183288. In an embodiment with transmitter frequency of 640,000 Hz, this results in a shift of about 6.5 Hz. In this case, the Doppler frequency shift would see approximately either 1 more or one less cycle for every 100,000 cycles of the fundamental tone.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims. It will be clear to those skilled in the art, that the received signal may be down modulated to an intermediate frequency. Said signal may be decimated by another appropriate rate to reduce the processing requirements. The transmit frequency can be scaled to match the expected return component in the decimated received signal, to facilitate accurate cancellation. This technique would result in an embodiment that would introduce said down modulation between components 502 and 503 of FIG. 5.

What is claimed:

1. A method for measuring the flow rate of a fluid or gas or multi-phase flow flowing through a pipeline, the method comprising:
    transmitting, by a transmit transducer, a transmitted signal into an outer shell of a pipeline;
    receiving, by a receive transducer, a received signal reflected from the contents of the pipeline;
    filtering, by a computer system, the received signal to remove noise to produce a filtered signal;
    processing, by the computer system, the filtered signal to cancel one or more transmitted signal components in the filtered signal, wherein the processing comprises:
        determining, by the computer system, a complex coefficient to model amplitude and phase of the transmitted signal components;
        scaling and rotating to a correct phase, the transmitted signal, based on the complex coefficient to generate a predicted signal that predicts the transmitted signal components in the received signal; and
        subtracting the predicted signal from the filtered signal;
    applying, by the computer system, one or more Goertzel detectors to determine a Doppler frequency from the processed filtered signal;
    deriving, by the computer system, a flow rate from the Doppler frequency.

2. The method of claim 1, further comprising:
    filtering the received signal with a bandpass filter.

3. The method of claim 1, further comprising:
    averaging the Doppler frequency with the Doppler frequency of one or more samples prior to deriving the flow rate from the Doppler frequency.

4. The method of claim 1, further comprising:
    decimating the filtered signal.

5. The method of claim 1, further comprising:
    using a least mean squares algorithm to compute the complex coefficient.

6. The method of claim 1, wherein the one or more Goertzel detectors are centered at different Doppler frequencies.

7. The method of claim 1, further comprising:
    applying a plurality of distinct Goertzel detectors to the filtered signal.

8. The method of claim 1, further comprising:
    applying a plurality of distinct Goertzel detectors to the filtered signal, each of the Goertzel detectors centered at a different Doppler frequency.

9. The method of claim 1, further comprising:
    calculating the speed of sound in the contents of the pipeline.

10. A non-transitory computer-readable medium containing instructions for measuring the flow rate of a fluid or gas or multi-phase flow flowing through a pipeline, the non-transitory computer readable medium comprising instructions for:
    transmitting a transmitted signal into an outer shell of a pipeline;
    receiving a received signal reflected from the contents of the pipeline;
    filtering the received signal to remove noise to produce a filtered signal;
    processing the filtered signal to cancel one or more transmitted signal components in the filtered signal, wherein the processing comprises:
        determining a complex coefficient to model amplitude and phase of the transmitted signal components;
        scaling and rotating to a correct phase, the transmitted signal, based on the complex coefficient to generate a predicted signal that predicts the transmitted signal components in the received signal; and subtracting the predicted signal from the filtered signal;

applying one or more Goertzel detectors to determine a Doppler frequency from the processed filtered signal;

deriving a flow rate from the Doppler frequency.

11. The non-transitory computer-readable medium of claim 10, further comprising instructions for:

filtering the received signal with a bandpass filter.

12. The non-transitory computer-readable medium of claim 10, further comprising instructions for:

averaging the Doppler frequency with the Doppler frequency of one or more samples prior to deriving the flow rate from the Doppler frequency.

13. The non-transitory computer-readable medium of claim 10, further comprising instructions for:

decimating the filtered signal.

14. The non-transitory computer-readable medium of claim 10, further comprising instructions for:

using a least mean squares algorithm to compute the complex coefficient.

15. The non-transitory computer-readable medium of claim 10, wherein the one or more Goertzel detectors are centered at different Doppler frequencies.

16. The non-transitory computer-readable medium of claim 10, further comprising instructions for:

applying a plurality of Goertzel detectors to the filtered signal.

17. The non-transitory computer-readable medium of claim 10, further comprising instructions for:

applying a plurality of distinct Goertzel detectors to the filtered signal, each of the Goertzel detectors centered at a different Doppler frequency.

18. The non-transitory computer-readable medium of claim 10, further comprising instructions for:

calculating the speed of sound in the contents of the pipeline.

* * * * *